United States Patent
Tsai et al.

(10) Patent No.: US 7,109,631 B2
(45) Date of Patent: Sep. 19, 2006

(54) LOW COGGING AND EASY-TO-DOWNSIZE SPINDLE MOTOR STRUCTURE

(75) Inventors: Ming-Chin Tsai, Kaohsiung (TW);
Chuen-Fuu Wu, Kaohsiung (TW);
Liang-Yi Hsu, Kaohsiung (TW);
Mi-Ching Tsai, Kaohsiung (TW)

(73) Assignee: Metal Industries Research and Development Centre, Kaohsiung (TW)

( * ) Notice: Subject to any disclaimer, the term of this patent is extended or adjusted under 35 U.S.C. 154(b) by 0 days.

(21) Appl. No.: 11/056,163

(22) Filed: Feb. 14, 2005

(65) Prior Publication Data

US 2006/0113855 A1 Jun. 1, 2006

(30) Foreign Application Priority Data

Nov. 26, 2004 (TW) .............................. 93136633 A

(51) Int. Cl.
*H02K 1/00* (2006.01)
*H02K 7/00* (2006.01)
*H02K 5/16* (2006.01)
*G11B 17/02* (2006.01)

(52) U.S. Cl. ...................... 310/268; 310/67 R; 310/90; 360/99.08

(58) Field of Classification Search .............. 310/67 R, 310/267, 268; 360/97.08, 99.07, 99.08, 99.11, 360/98.07
See application file for complete search history.

(56) References Cited

U.S. PATENT DOCUMENTS

| | | | | |
|---|---|---|---|---|
| 4,891,537 A | * | 1/1990 | Shiraki et al. | ............ 310/68 B |
| 6,195,226 B1 | * | 2/2001 | Papst | ...................... 360/99.08 |
| 6,509,666 B1 | * | 1/2003 | Huang et al. | ................ 310/254 |
| 6,605,883 B1 | * | 8/2003 | Isozaki et al. | ............ 310/49 R |
| 6,762,526 B1 | * | 7/2004 | Isozaki et al. | .............. 310/112 |

* cited by examiner

*Primary Examiner*—Tran Nguyen
(74) *Attorney, Agent, or Firm*—Reed Smith LLP; Stanley P. Fisher, Esq.; Juan Carlos A. Marquez, Esq.

(57) ABSTRACT

The present invention relates to a low cogging and easy-to-downsize spindle motor structure. The motor is an axial magnetic flux spindle motor comprising a stator assembly and a rotor assembly. The stator assembly comprises a deck for seating the rotor assembly and at least one bearing placed on the housing of said stator and between the stator and the rotor. The outer periphery part of the bearings is the stationary part; with the inner part of said bearings being the rotating part. A cylindrical shaft is located in the center of the rotor. When the thin windings of stator are excited with current, a rotating magnetic field is created, forcing said rotor into rotation, and as a consequence, bringing the spindle into rotation that generates motor output needed to drive loads.

12 Claims, 4 Drawing Sheets

LOW COGGING AND EASY-TO-DOWNSIZE SPINDLE MOTOR STRUCTURE

BACKGROUND OF THE INVENTION

1. Field of the Invention

The present invention relates to an innovative structure for spindle motor, particularly one designed for low cogging and easy downsizing.

2. Description of the Related Art

The advent of the so-called information age is due, in most part, to the proliferation of the mass media and the internet, but the development of the spindle motor, which is most often used in Optical Disk Drives or hard disk drivers to store massive electronic data, also plays a key role.

Nowadays, as compact and lightweight designs have become the mainstream of the market and even the norms of the industry, most electronic products have to be made smaller and smaller to meet consumers' insatiable demand for things slim and small. As a result, the thinning of components in such products is becoming increasingly important. The spindle motor is no exception to this trend. Manufacturers have been making every effort to make it smaller, while at the same time, trying hard to keep, or even increase, its operating performance. As nearly all electronic products are required, either by consideration of user comfort or by a device's need for efficiency and ease of operation, to have stable and smooth running motors, such motors as used in Optical Disk Drives and hard disk drivers all have to meet a very high standard in this respect. As a result, many smooth running micro motors have been developed by industries.

However, development of all these micro motors of the prior art have now reached a bottleneck. Most conventional permanent-magnet motors, for instance, be they brushed or brushless, adopt either a radial air gap or a radial magnetic flux structure. As the motors contain multiple permanent-magnets or a lot of soft magnetic materials, they sometimes produce magnetic cogging that make the motors wobble when the motors are running, generating torque ripples and causing uneven rotation or vibration of the motors.

Another type of motors use the axial air gap or axial magnetic flux structure. They suffer less cogging resulted from magnetic field because they contain little soft magnetic materials, but their flattened, dwarfed structures make them susceptible to axial attractive force, significantly shortening the service life of such parts as the shafts and the bearings. It is obvious that these conventional motors are far from being satisfactory when used in electronic products that require highly smooth and stable running.

DETAILED DESCRIPTION OF THE INVENTION

In view of the aforementioned problems faced by the prior art, the present invention provides a solution to the problems by introducing a new and innovative spindle motor structure both easy to downsize and obtain smooth running.

The spindle motor is an axial magnetic flux spindle motor comprising at least one stator assembly and at least one rotor assembly. The stator assembly comprises a deck for seating at least one rotor assembly and at least one bearing. The stator assembly further comprises a set of thin windings, a stator housing, and a stator magnetic yoke. The rotor assembly comprises a permanent magnetic ring, a rotor housing, and a spindle in the center. The bearing(s) is/are placed on the housing of the stator and between the stator and the rotor. Besides, the outer periphery part of the bearings is/are the stationary part; with the inner part of the bearings being the rotating part. When the thin windings of stator are connected to a power supply, a rotating magnetic field is created by the thin windings and the permanent magnetic ring, forcing the rotor into rotation, and as a consequence, bringing the spindle into rotation that generates motor output needed to drive loads The present invention also aims to introduce another type of low cogging and easy-to-downsize structure to be used in spindle motors to generate more drive power.

With regard to the aim of the present invention, the spindle motor is an axial flux spindle motor comprising at least two stator assemblies and at least two rotor assemblies. The stator assemblies comprise a deck for seating at least two rotor assemblies and at least two bearings. The stator assemblies further comprises at least a set of thin windings, at least two stator housings. The rotor assemblies comprise at least two permanent magnetic rings, at least two rotor housings, at least two bearings, and a spindle in the center of at least two rotors. The at least two rotors further comprise at least two rotor magnetic yokes. The at least two bearings are placed on the housing of the stator and between the stators and the rotors. Besides, the outer periphery part of the bearings is the stationary part; with the inner part of the bearings being the rotating part. When the at least one thin windings of at least two stators are connected to a power supply, a rotating magnetic field is created by the thin windings and the permanent magnetic ring, forcing the rotors into rotation, and as a consequence, bringing the spindle into rotation and generating greater motor output for the user. Here, one thing must be noted that at least two stator assemblies in the structure of the present invention are stacked one on top of the other.

DETAILED DESCRIPTION OF THE PREFERRED EMBODIMENT

Before explaining the disclosed embodiment of the present invention in detail it is to be understood that the invention is not limited in its application to the details of the particular arrangement shown here since the invention is capable of other embodiments. Also, the terminology used herein is for the purpose of description and not of limitation The present invention relates a spindle motor structure designed for low cogging and easy downsizing. The motor is an axial magnetic flux spindle motor comprising at least one stator assembly and at least one rotor assembly. The stator assembly comprises a deck for seating the rotor assembly and at least one bearing placed on the housing of the stator and between the stator and the rotor. A spindle is in the center of the rotor. When the thin windings of stator are connected to a current, a rotating magnetic field is created between the thin coils and the permanent magnetic ring, forcing the rotor into rotation, and as a consequence, bringing the spindle into rotation that generates motor output needed to drive loads. Via introducing better structural designs for the motor, the present invention minimizes the cogging of the motor's spindle, improves the rigidity of the motor, and makes the entire motor structure easy to downsize.

The following is the detailed description of a preferred embodiment of the invention, which will be better understood with the illustrations given after it.

Figure 1:
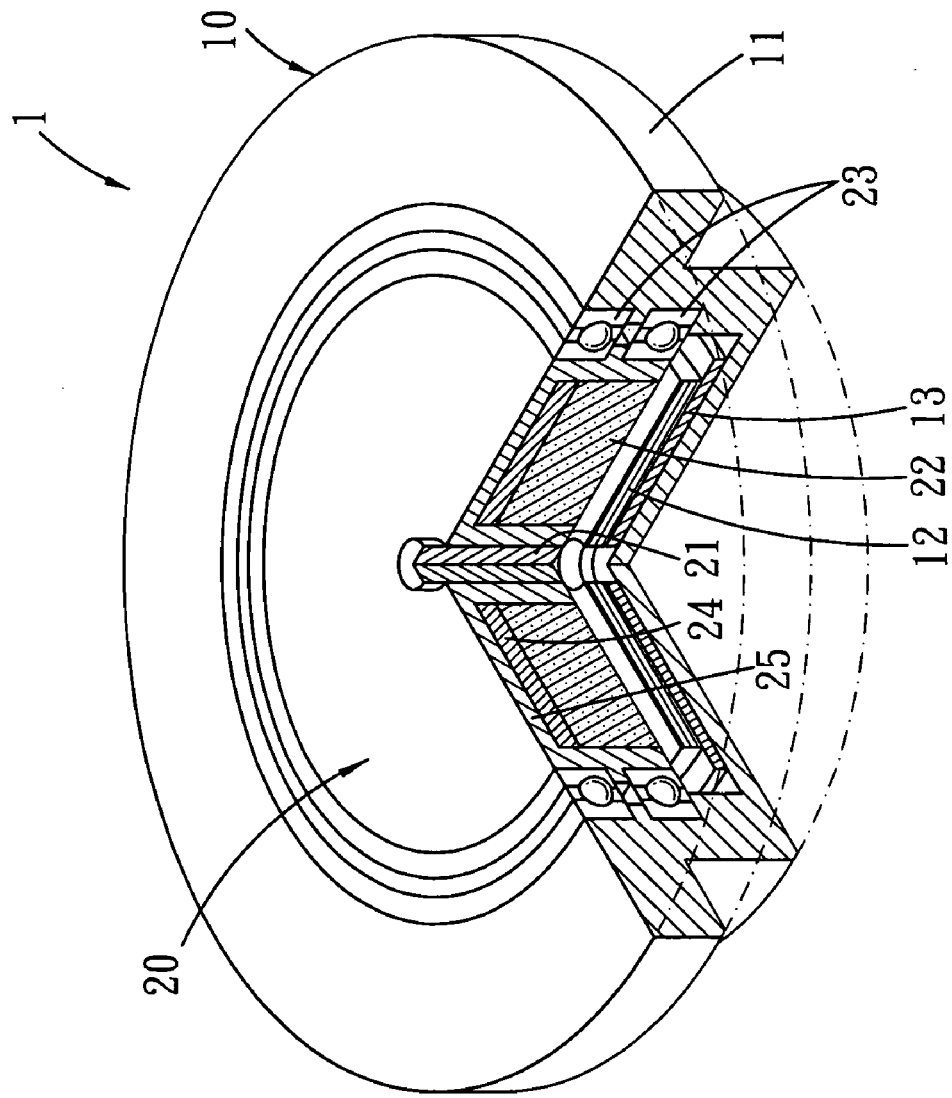
FIG. 1 shows the three dimensional cross sectional view of a preferred embodiment of the present invention.
Figure 2:
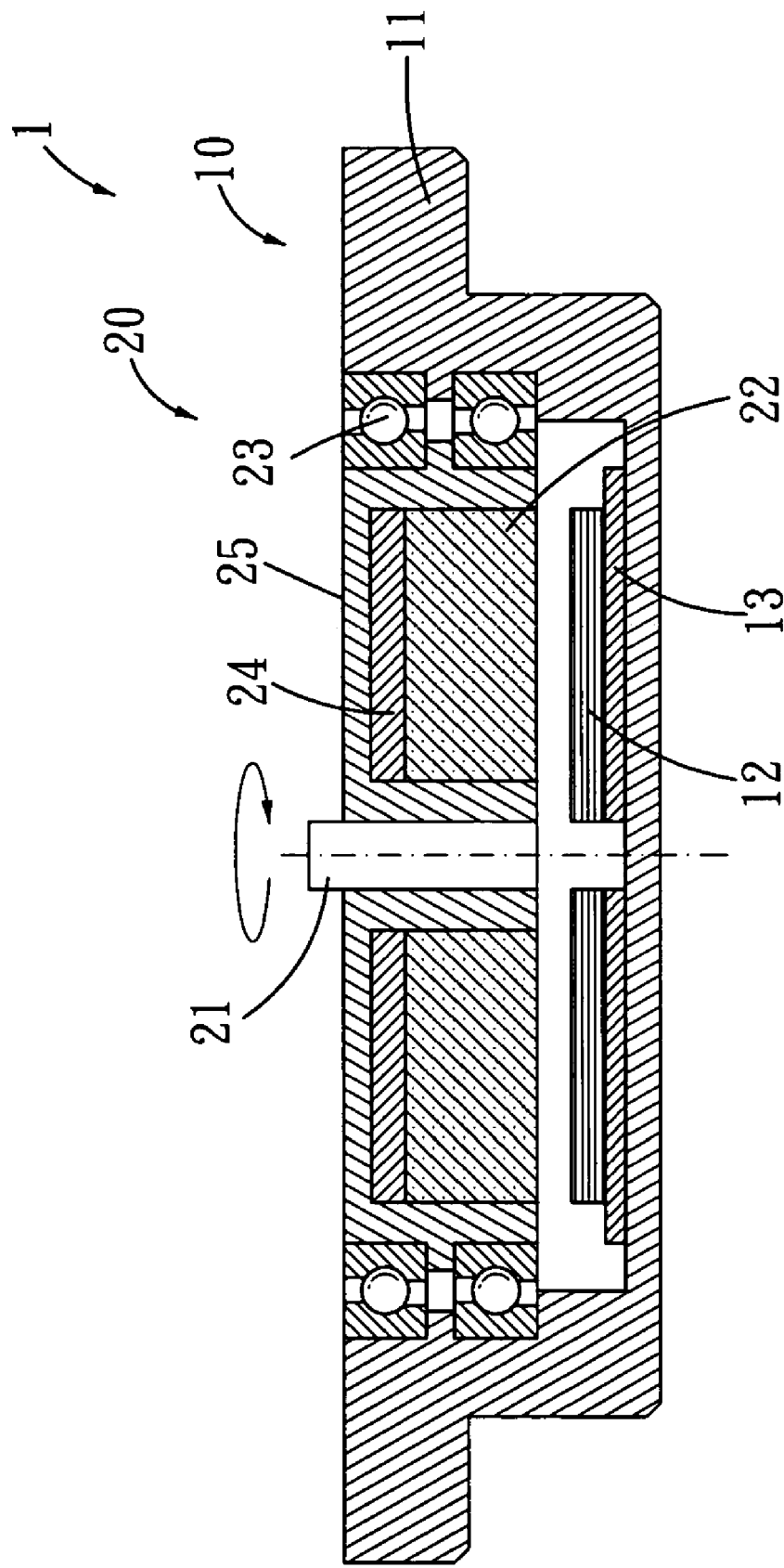
FIG. 2 shows the cross sectional side view of a preferred embodiment of the present invention.

FIGS. 1 and 2 show a spindle motor structure designed for low cogging and easy downsizing. The structure comprises a stator assembly 10 and a rotor assembly 20, and a terraced deck, which is caved in the middle of the stator assembly 10, for seating the rotor assembly 20.

The stator assembly 10 also comprises a stator housing 11, a stator magnetic yoke 13 placed on the lower terrace of the deck, and a set of thin windings 12 stacked on top of the stator magnetic yoke 13. The stator assembly 10 is enveloped in the stator housing 11. The rotor assembly 20 comprises a spindle 21, a permanent magnet ring 22, at least one bearing 23, a rotor magnetic yoke 24, a rotor housing 25. The spindle 21 is placed in the true center of the rotor assembly 20. The permanent magnetic ring 22 is placed on the bottom of the rotor assembly 20, while the rotor magnetic yoke 24 is placed between the permanent magnetic ring 22 and the rotor housing 25 and the rotor assembly 20 is enveloped in the rotor housing 25.

Again, FIGS. 1 and 2 show a cross sectional view of a spindle motor structure designed for low cogging and easy downsizing. The motor is an axial magnetic flux spindle motor 1 comprising a stator assembly 10 and a rotor assembly 20. Before the rotor assembly 20 and at least one the bearing 23 are seated on the deck of the stator assembly 10, the stator magnetic yoke 13 is set on the lower terrace of the deck of the stator assembly 10, with the thin windings 12 placed on the stator magnetic yoke 13. The at least one bearing 23 is set on the stator assembly 10, or to be more precise, on the stator's housing 11. In other words, the at least one bearing 23 is seated between the stator assembly 10 and the rotor assembly 20. And, of course, the rotor assembly 20 is also seated on the stator's deck 10. The outer periphery part of the at least one bearing 23 is the stationary part; with the inner part of the bearing 23 being the rotating part. As an air gap exists between the thin windings 12 and the rotor assembly's 20 permanent magnetic ring 22, when the thin windings 12 of stator 10 are excited with current, a rotating magnetic field is created between the thin windings 12 and the permanent magnetic ring 22, forcing the rotor assembly 20 into rotation, and consequently bringing the spindle 21 into rotation that generates motor output needed to drive loads.

There is also another preferred embodiment of the invention. When a single-rotor spindle motor can not produce enough drive force for some desired purpose, one can assemble two single-rotor spindle motor into a twin-rotor spindle motor to produce greater toque. The following is a detailed description of how the twin-rotor spindle motor is assembled and put to work.

Figure 3:
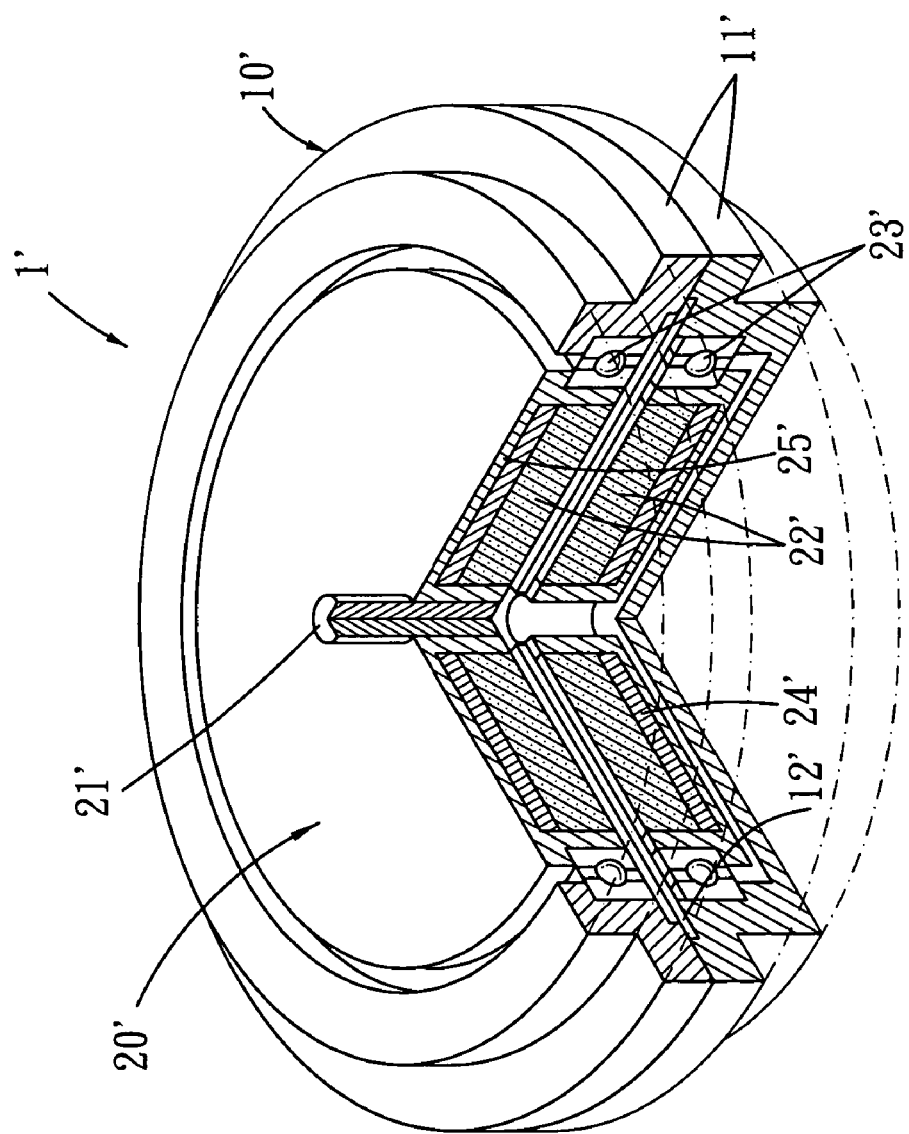
FIG. 3 shows the three dimensional cross sectional view of another preferred embodiment of the present invention.
Figure 4:
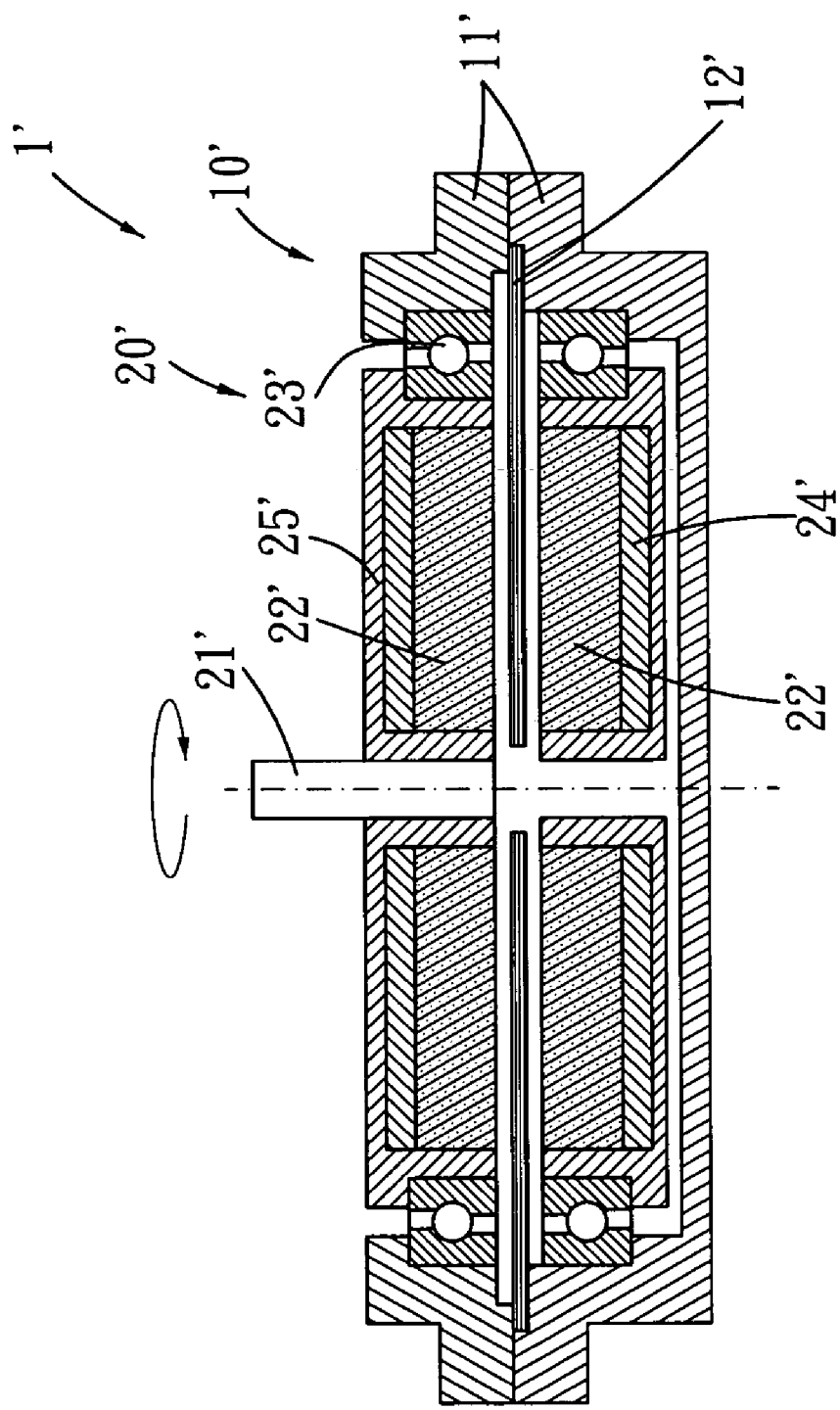
FIG. 4 shows the cross sectional side view of another preferred embodiment of the present invention.

FIGS. 3 and 4 show the structure of a low cogging and easy-to-down size twin-rotor spindle motor 1'. The structure of the spindle motor is an axial magnetic flux spindle motor comprising at least two stator assemblies 10' and at least two rotor assemblies 20'. Each of the stator assemblies 10' comprises a deck, caved in the middle, for seating at least one the rotor assemblies 20'.

The at least two stator assemblies 10' further comprises at least a set of thin windings 12', and at least two stator housings 11' which envelope the stator assemblies 10'. The at least two rotor assemblies 20' comprise at least two permanent magnetic rings 22', at least two rotor housings 25', and a spindle 21' in the center of at least two rotor assemblies 20'. The at least two rotors assemblies 20' further comprise at least two rotor magnetic yokes 24', and at least two bearings 23' placed on the housing of the stator and between the stators and the rotors. The permanent magnetic rings 22' are placed at the bottom of the rotor assemblies 20' respectively. The rotor magnetic yokes 24' are placed between the permanent magnetic rings 22' and the rotor housings 25', which envelop the rotors, of course.

Again, FIGS. 3 and 4 show the cross sectional view of a spindle motor structure designed for low cogging and easy downsizing. The motor is an axial magnetic flux spindle motor 1' comprising at least two stator assemblies 10' and at least two rotor assemblies 20'. Before the at least rotor assemblies 20' and at least two the bearings 23' are seated on the at least two stator assemblies 10', the rotor magnetic yokes 24' must first be set on the lower terrace of the deck of the stator assemblies 10', with the at least one set of thin windings 12' placed in the gap between the two stacked rotor assemblies 20'. Further, The at least two bearings 23' are set on the at least two stator assemblies 10', or to be more precise, on the at least two stator's housings 11'. In other words, the at least two bearings 23' are seated between the at least two stator assemblies 10' and the at least two rotor assemblies 20'. The outer periphery part of the at least two bearings 23' is the stationary part; with the inner part of the bearings 23' being the rotating part. As an air gap exists between the at least one set of thin windings 12' and the at least two rotor assemblies' 20 permanent magnetic rings 22', when the thin windings 12' of stator assemblies 10' are charged with electric current, a rotating magnetic field is created between the thin windings 12' and the permanent magnetic ring 22', forcing the at least two rotors 20' into rotation, and consequently bringing the spindle 21' into rotation, which in turn turns out more motor output needed to drive loads.

Here, about the present invention of low cogging and easy-to-downsize spindle motor, one thing must be noted: the at least two stators in the structure of the spindle motor 1' are stacked one on top of the other.

In the above description of the preferred embodiment of the present invention of low cogging and easy-to-downsize spindle motor structure, the stators are stated to comprise magnetic yokes. This should by no means be interpreted as a limitation on the embodiment of the invention. The spindle motor's stators, in different applications, may contain no magnetic yokes, and/or many change the dimensions of the magnetic yokes in order to achieve the downsizing of the motors.

Also in the above description of the preferred embodiment of the present invention of low cogging and easy-to-downsize spindle motor structure, the twin rotor spindle motor structure is stated to be built at the same time. This should by no means be interpreted as a limitation on the embodiment of the invention. The twin rotor spindle motor, in different applications, can be built with each rotor assembly placed inside a stator assembly and then put together, except that the thin coils must first be placed in a proper position between the two stator assemblies before they are put together to form the twin rotor spindle motor.

From the above detailed description and illustration, it is easy to see that the present invention of low cogging and easy-to-downsize spindle motor structure enjoys the following advantages and possesses the following and improved features when compared with prior art practices:

1. The present invention is a low cogging and easy-to-downsize spindle motor structure. It ensures low cogging and improved reliability over prior art motor structures.

2. The present invention is a low cogging and easy-to-downsize spindle motor structure. Compared with prior art motor structures, it effectively lowers the conventionally high defective rate resulted from the use of too tiny bearings, allowing the motor to last significantly longer.

As is understood by a person skilled in the art, the foregoing preferred embodiment of the present invention is an illustration, rather than a limiting description, of the present invention. It is intended to cover various modifications and similar arrangements included within the spirit and scope of the appended claims, the scope of which should be accorded the broadest interpretation so as to encompass all such modifications and similar structures.

What is claimed is:

1. A low cogging and easy-to-downsize spindle motor structure comprising:
   a stator assembly that further comprises a terraced deck caved in the middle, a set of thin windings, and a stator housing, with said thin windings stacked on top of the deck, and said stator enveloped by said stator housing; and
   a rotor assembly seated on top of said thin windings and comprising a spindle, at least one bearing, a permanent magnetic ring, and a rotor housing, with said spindle being in the center of said rotor assembly, said bearing being between said stator assembly and said rotor assembly, said permanent magnetic ring being on the bottom of said rotor assembly, and said rotor being enveloped by said rotor housing,
   wherein the outer periphery part of said at least one bearing is the stationary part and is in contact with said stator assembly; with the inner part of said bearings being the rotating part and in contact with said rotor assembly that when said rotor rotates, said spindle in said rotor's center is brought into rotation, too.

2. A low cogging and easy-to-downsize spindle motor structure as claimed in claim 1, wherein said stator assembly further comprises a stator magnetic yoke with said stator magnetic yoke placed between said deck and said thin windings.

3. A low cogging and easy-to-downsize spindle motor structure as claimed in claim 1, wherein said rotor assembly further comprises a rotor magnetic yoke with said rotor magnetic yoke placed between said permanent magnetic ring and said rotor housing.

4. A low cogging and easy-to-downsize spindle motor structure as claimed in claim 1, wherein said thin windings in said stator assembly is made of an magnetic material.

5. A low cogging and easy-to-downsize spindle motor structure as claimed in claim 1, wherein said permanent magnetic ring is a material producing permanent magnetic field.

6. A low cogging and easy-to-downsize spindle motor structure comprising:
   at least two stator assemblies, each of which further comprises a terraced deck caved in the middle, at least one set of thin windings, and at least two stator housings, with said thin coils placed between said at least two stator assemblies, and said at least two stators enveloped by said at least two stator housings; and
   at least two rotor assemblies, seated above and below said thin windings respectively, comprising a spindle, at least two bearings, at least two permanent magnetic rings, and at least two rotor housings, with said spindle being in the center of said at least two rotor assemblies, said at least two bearings being seated between said at least two stator assemblies and said at least two rotor assemblies, said at least two permanent magnetic rings being seated on the bottom of said rotor assemblies, and said at least two rotors being enveloped by said at least two rotor housings,
   wherein the outer periphery part of said at least one bearing is the stationary part and is in contact with said stator assembly; with the inner part of said bearings being the rotating part and in contact with said rotor assembly that when said at least two rotor rotate, said spindle in said at least two rotor's center is brought into rotation, too.

7. A low cogging and easy-to-downsize spindle motor structure as claimed in claim 6, wherein said stator assemblies further comprise at least two stator magnetic yokes with said stator magnetic yokes placed between said deck and said thin windings.

8. A low cogging and easy-to-downsize spindle motor structure as claimed in claim 6, wherein said rotor assemblies further comprise at least two rotor magnetic yoke with said at least rotor magnetic yoke placed between said at least two permanent magnetic rings and said at least two rotor housings.

9. A low cogging and easy-to-downsize spindle motor structure as claimed in claim 6, wherein at least two rotor assemblies must be fitted on said at least two stator housings first and then at least one set of thin coils can be placed between said at least two stator housings.

10. A low cogging and easy-to-downsize spindle motor structure as claimed in claim 6, wherein said thin coils in said stator assembly is made of an magnetic material.

11. A low cogging and easy-to-downsize spindle motor structure as claimed in claim 6, wherein said at least two permanent magnetic ring are a material producing permanent magnetic field.

12. A low cogging and easy-to-downsize spindle motor structure as claimed in claim 6, wherein said at least two stator assemblies of said spindle motor are stacked one on top of the other.

* * * * *